US012574992B2

(12) United States Patent
Fujishiro

(10) Patent No.: US 12,574,992 B2
(45) Date of Patent: Mar. 10, 2026

(54) COMMUNICATION CONTROL METHOD AND USER EQUIPMENT UTILIZING AN INACTIVITY TIMER FOR MULTICAST BROADCAST SERVICE

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 310 days.

(21) Appl. No.: 18/503,004

(22) Filed: Nov. 6, 2023

(65) Prior Publication Data

US 2024/0080935 A1     Mar. 7, 2024

Related U.S. Application Data

(63) Continuation of application No. PCT/JP2022/019529, filed on May 2, 2022.

(30) Foreign Application Priority Data

May 7, 2021     (JP) ................................. 2021-079265

(51) Int. Cl.
*H04W 76/00*          (2018.01)
*H04L 12/18*          (2006.01)
(Continued)

(52) U.S. Cl.
CPC ........... *H04W 76/27* (2018.02); *H04L 12/189* (2013.01); *H04W 76/38* (2018.02)

(58) Field of Classification Search
CPC ....... H04W 76/27; H04W 76/38; H04W 4/40; H04W 76/40; H04W 88/02; H04W 4/06; H04L 12/189
See application file for complete search history.

(56) References Cited

U.S. PATENT DOCUMENTS

2014/0307659 A1*  10/2014  Kweon ................. H04W 76/34
                                              370/329
2019/0053324 A1*   2/2019  Tseng .................... H04W 76/30
                           (Continued)

FOREIGN PATENT DOCUMENTS

JP          7689177 B2      6/2025

OTHER PUBLICATIONS

3rd Generation Partnership Project; Technical Specification Group Radio Access Network; NR; NR and NG-RAN Overall Description; Stage 2 (Release 16); 3GPP TS 38.300 V16.3.0; Sep. 2020; pp. 1-148.

*Primary Examiner* — Pakee Fang
(74) *Attorney, Agent, or Firm* — Studebaker Brackett PLLC

(57)          ABSTRACT

A communication control method according to a first aspect is a communication control method performed by a user equipment in a mobile communication system that provides a multicast broadcast service (an MBS). The communication control method includes receiving MBS data from a base station in a Radio Resource Control (an RRC) connected state; managing a timer that times a time when transmission and reception of data and signaling are not performed with the base station; and transitioning from the RRC connected state to an RRC idle state in response to expiration of the timer. The managing of the timer includes controlling not to start the timer even if the MBS data is received when the MBS data transmitted via multicast or broadcast is received.

4 Claims, 12 Drawing Sheets

(51) Int. Cl.
　　 *H04W 76/27*　　　　 (2018.01)
　　 *H04W 76/38*　　　　 (2018.01)

(56)　　　　　　 References Cited

U.S. PATENT DOCUMENTS

2023/0189299 A1 *　6/2023　Fujishiro ................. H04W 4/06
　　　　　　　　　　　　　　　　　　　 370/312
2023/0269828 A1 *　8/2023　Shrivastava .......... H04W 76/30
　　　　　　　　　　　　　　　　　　　 370/312
2023/0370905 A1 *　11/2023　Babaei .............. H04W 36/0007
2023/0397299 A1 *　12/2023　Dai ......................... H04W 4/08
2024/0080935 A1　　3/2024　Fujishiro
2024/0196173 A1 *　6/2024　Chen ................... H04W 72/121

* cited by examiner

COMMUNICATION CONTROL METHOD AND USER EQUIPMENT UTILIZING AN INACTIVITY TIMER FOR MULTICAST BROADCAST SERVICE

RELATED APPLICATIONS

The present application is a continuation based on PCT Application No. PCT/JP2022/019529, filed on May 2, 2022, which claims the benefit of Japanese Patent Application No. 2021-079265 filed on May 7, 2021. The content of which is incorporated by reference herein in their entirety.

TECHNICAL FIELD

The present disclosure relates to a communication control method and a user equipment used in a mobile communication system.

BACKGROUND OF INVENTION

In recent years, a mobile communication system of the fifth generation (5G) has attracted attention. New Radio (NR), which is a Radio Access Technology (RAT) of the 5G system, has features such as high speed, large capacity, high reliability, and low latency compared to Long Term Evolution (LTE), which is a fourth-generation radio access technology.

CITATION LIST

Non-Patent Literature

Non-Patent Document 1: 3GPP Technical Specification "3GPP TS 38.300 V16.3.0 (2020-09)"

SUMMARY

A communication control method according to a first aspect is a communication control method performed by a user equipment in a mobile communication system that provides a multicast broadcast service (an MBS). The communication control method includes receiving MBS data from a base station in an RRC connected state; managing a timer that times a time when transmission and reception of data and signaling are not performed with the base station; and transitioning from the RRC connected state to an RRC idle state in response to expiration of the timer. The managing the timer includes controlling not to start the timer even if the MBS data is received when the MBS data transmitted via multicast or broadcast is received.

A communication control method according to a second aspect is a communication control method performed by a user equipment in a mobile communication system that provides a multicast broadcast service (an MBS). The communication control method includes managing a timer that times a time when transmission and reception of data are not performed with a base station; and transitioning from an RRC connected state to an RRC idle state in response to expiration of the timer. The managing the timer includes restarting the timer by transmitting or receiving restart information before the timer expires when MBS data transmitted via multicast is received from the base station.

A user equipment according to a third aspect includes a processor that performs the communication control method according to the first aspect or the second aspect.

DESCRIPTION OF EMBODIMENTS

Introduction of multicast broadcast services to the 5G system (NR) has been under study. NR multicast broadcast services are desired to provide enhanced services compared to LTE multicast broadcast services.

In view of this, the present disclosure provides a communication control method and a user equipment for implementing enhanced multicast broadcast services.

A mobile communication system according to an embodiment is described with reference to the drawings. In the description of the drawings, the same or similar parts are denoted by the same or similar reference signs.

Configuration of Mobile Communication System

Figure 1:
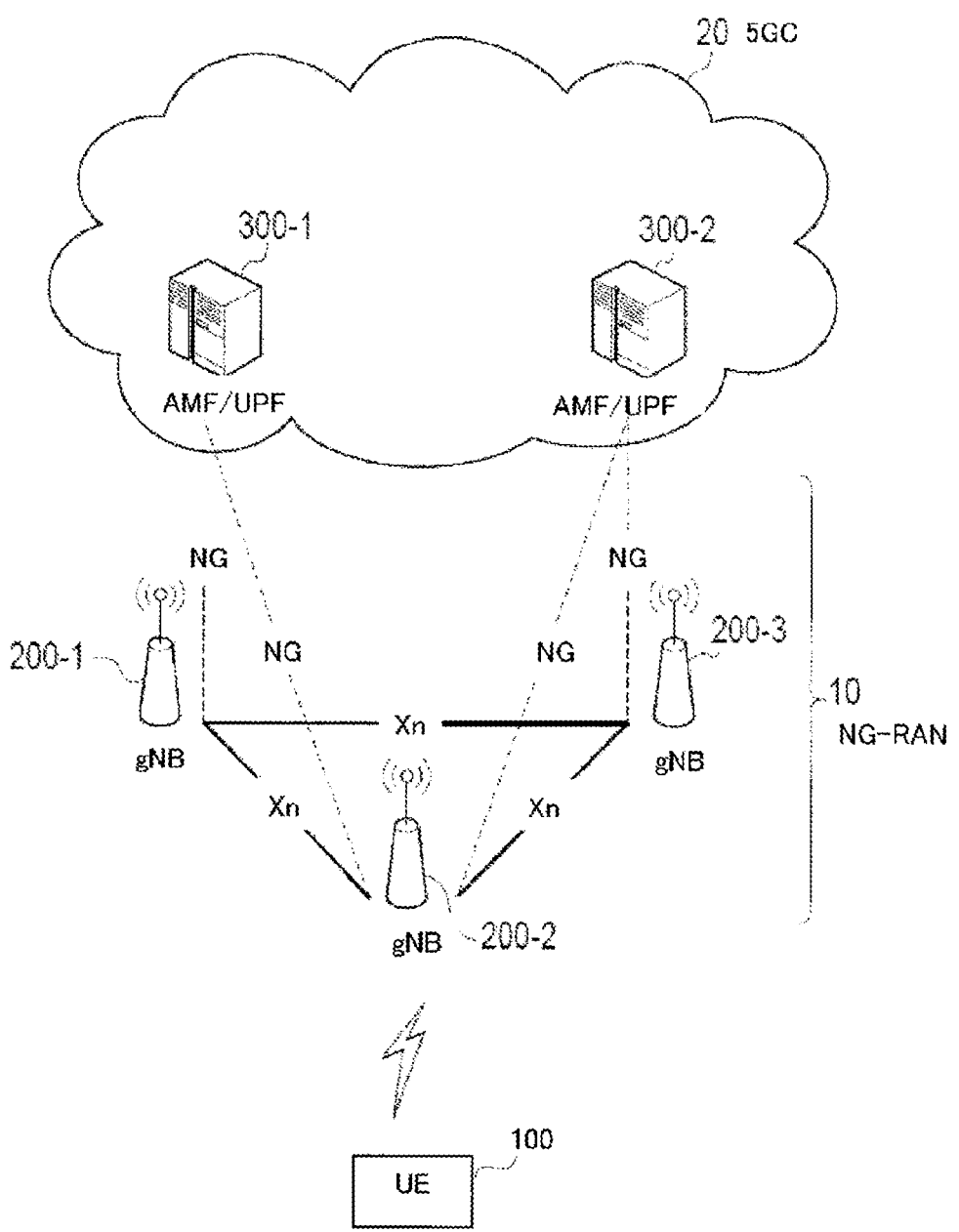
FIG. 1 is a diagram illustrating a configuration of a mobile communication system according to an embodiment.

First, a configuration of a mobile communication system according to an embodiment is described. FIG. 1 is a diagram illustrating a configuration of the mobile communication system according to an embodiment. This mobile communication system complies with the 5th Generation System (5GS) of the 3GPP standard. The description below takes the 5GS as an example, but Long Term Evolution (LTE) system may be at least partially applied to the mobile communication system. A sixth generation (6G) system may be at least partially applied to the mobile communication system.

As illustrated in FIG. 1, the mobile communication system includes a User Equipment (UE) 100, a 5G radio access network (Next Generation Radio Access Network (NG-RAN)) 10, and a 5G Core Network (5GC) 20.

The UE 100 is a mobile wireless communication apparatus. The UE 100 may be any apparatus as long as the UE 100 is used by a user. Examples of the UE 100 include a mobile phone terminal (including a smartphone) and/or a tablet terminal, a notebook PC, a communication module (including a communication card or a chipset), a sensor or an apparatus provided in the sensor, a vehicle or an apparatus provided in the vehicle (Vehicle UE), or a flying object or an apparatus provided in the flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or more cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signaling. The UPF controls data transfer. The AMF and UPF are connected to the gNB 200 via an NG interface which is an interface between a base station and the core network.

Figure 2:
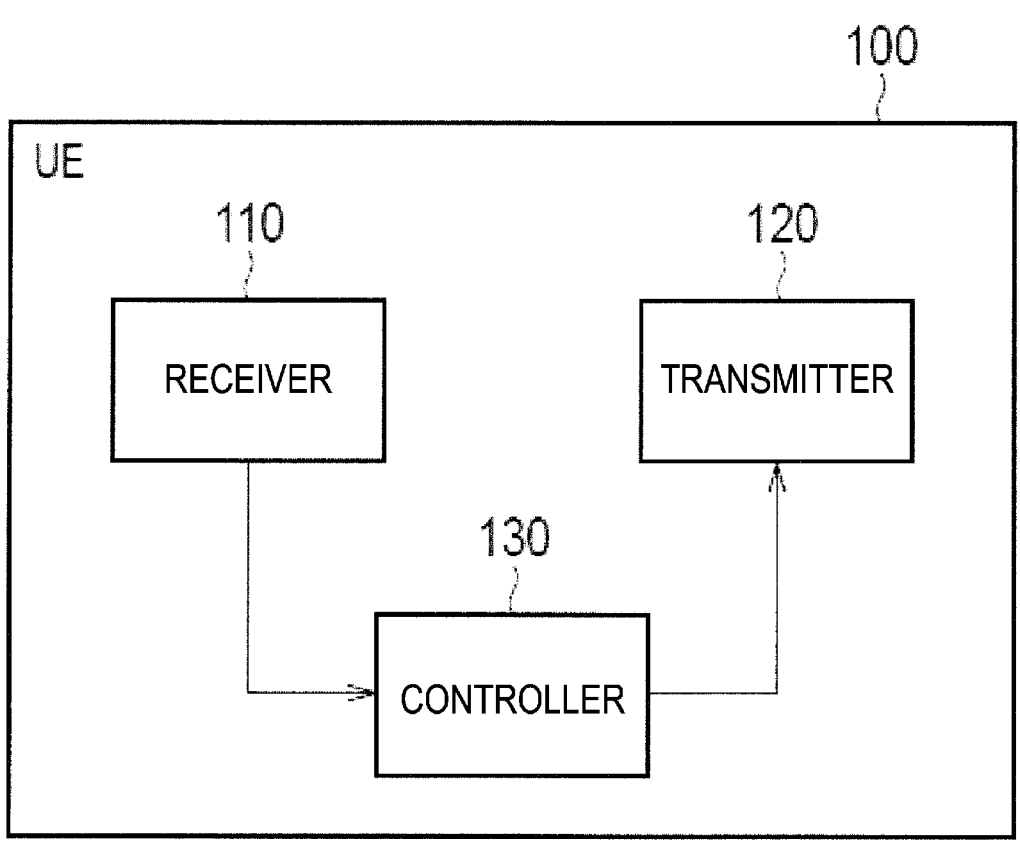
FIG. 2 is a diagram illustrating a configuration of a user equipment (UE) according to an embodiment.

FIG. 2 is a diagram illustrating a configuration of the user equipment (UE) 100 according to an embodiment.

As illustrated in FIG. 2, the UE 100 includes a receiver 110, a transmitter 120, and a controller 130.

The receiver 110 performs various types of reception under control of the controller 130. The receiver 110 includes an antenna and a reception device. The reception device converts a radio signal received by the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal (a transmission signal) output by the controller 130 into a radio signal and transmits the resulting signal through the antenna.

The controller 130 performs various types of control in the UE 100. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
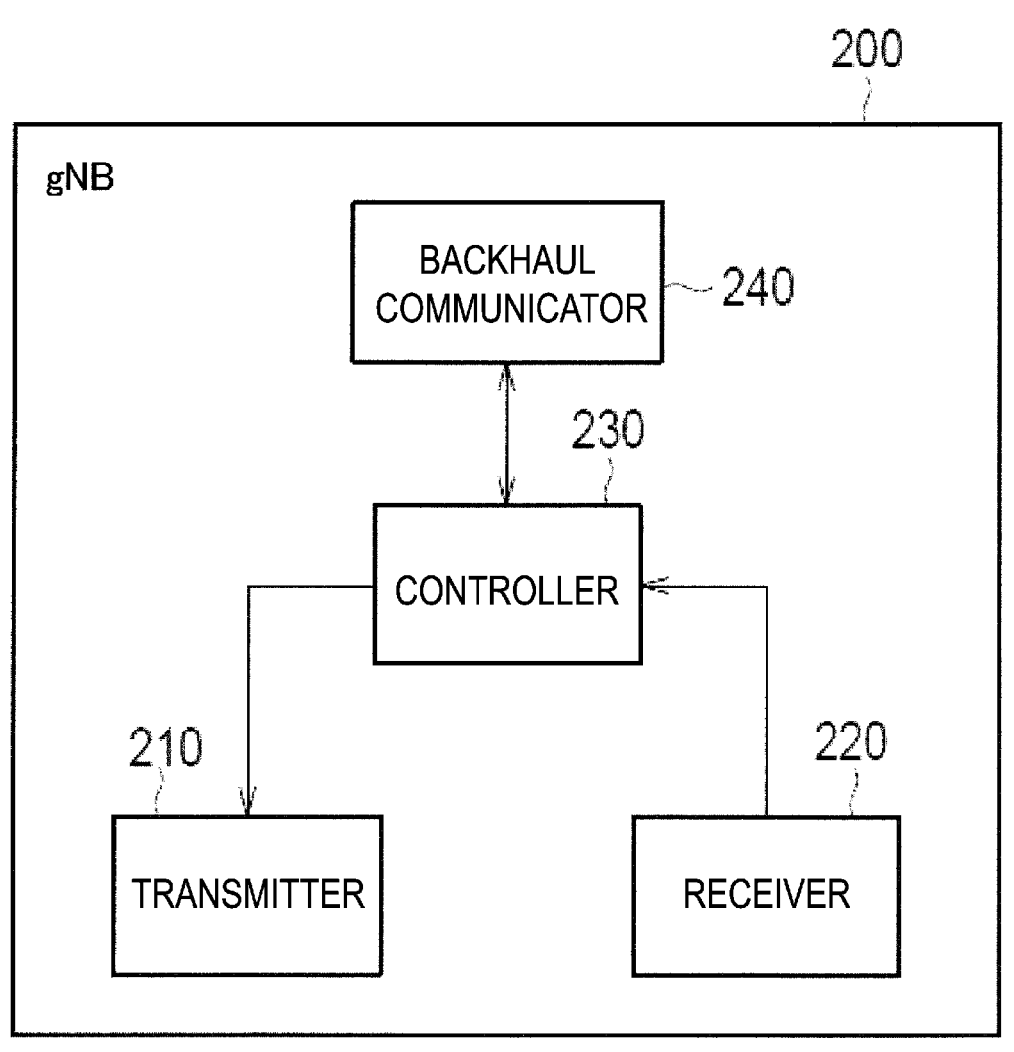
FIG. 3 is a diagram illustrating a configuration of a base station (gNB) according to an embodiment.

FIG. 3 is a diagram illustrating a configuration of the gNB 200 (base station) according to an embodiment.

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmission device. The transmission device converts a baseband signal (a transmission signal) output by the controller 230 into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls for the gNB 200. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
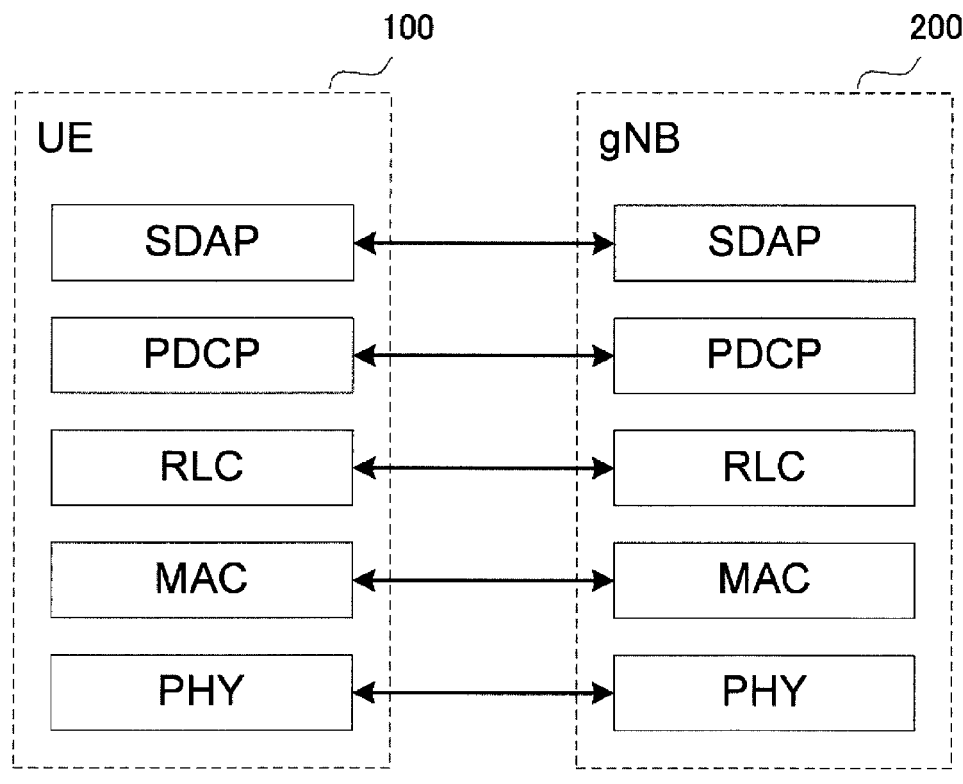
FIG. 4 is a diagram illustrating a configuration of a protocol stack of a radio interface of a user plane handling data.

FIG. 4 is a diagram illustrating a configuration of a protocol stack of a radio interface of a user plane handling data.

As illustrated in FIG. 4, a radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs priority control of data, retransmission processing through hybrid ARQ (Hybrid Automatic Repeat reQuest (HARM)), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, Modulation and Coding Schemes (MCSs)) in the uplink and the downlink and resource blocks to be allocated to the UE 100.

The RLC layer transmits data to the RLC layer on the reception end by using functions of the MAC layer and the PHY layer. Data and control information are transmitted between the RLC layer of the UE 100 and the RLC layer of the gNB 200 via a logical channel.

The PDCP layer performs header compression and decompression, and encryption and decryption.

The SDAP layer performs mapping an IP flow as the unit of Quality of Service (QoS) control performed by a core network to a radio bearer as the unit of QoS control performed by an Access Stratum (AS). Note that, when the RAN is connected to the EPC, the SDAP need not be provided.

Figure 5:
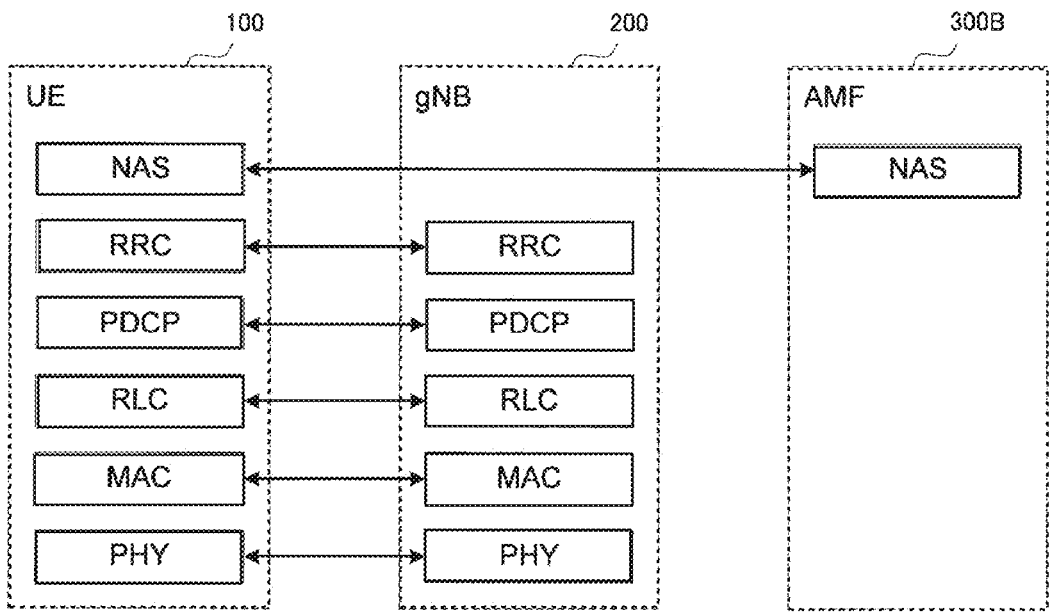
FIG. 5 is a diagram illustrating a configuration of a protocol stack of a radio interface of a control plane handling signaling (control signal).

FIG. 5 is a diagram illustrating a configuration of a protocol stack of a radio interface of a control plane handling signaling (a control signal).

As illustrated in FIG. 5, the protocol stack of the radio interface of the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel according to establishment, re-establishment, and release of a radio bearer. When a connection between the RRC of the UE 100 and the RRC of the gNB 200 (RRC connection) is present, the UE 100 is in an RRC connected state. When a connection between the RRC of the UE 100 and the RRC of the gNB 200 (RRC connection) is not present, the UE 100 is in an RRC idle state. When the connection between the RRC of the UE 100 and the RRC of the gNB 200 is suspended, the UE 100 is in an RRC inactive state.

The NAS layer which is positioned upper than the RRC layer performs session management, mobility management, and the like. NAS signaling is transmitted between the NAS layer of the UE 100 and the NAS layer of an AMF 300B.

Note that the UE 100 includes an application layer in addition to the protocol of the radio interface.

MBS

An MBS according to an embodiment is described. The MBS is a service in which the NG-RAN 10 can provide broadcast or multicast, i.e., Point To Multipoint (PTM) data transmission to the UE 100. The MBS may be referred to as the Multimedia Broadcast and Multicast Service (MBMS). Note that examples of use cases (service types) of the MBS include public safety communication, mission critical communication, Vehicle-to-Everything (V2X) communication, IPv4 or IPv6 multicast delivery, Internet Protocol TeleVision (IPTV), group communication, and software delivery.

Figure 6:
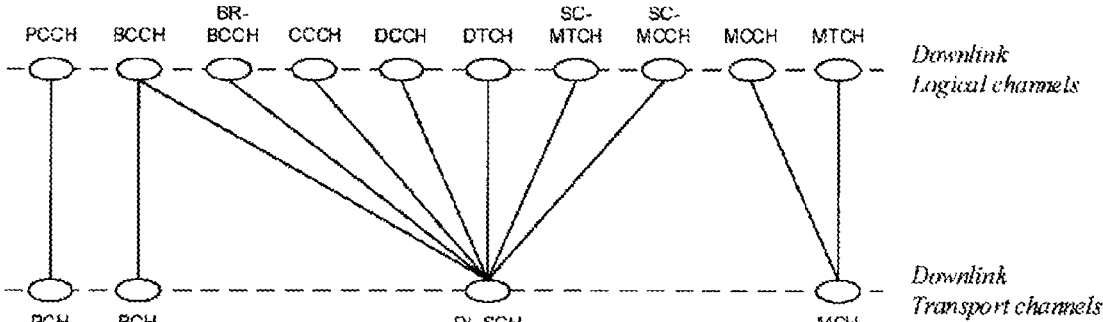
FIG. 6 is a diagram illustrating a correspondence relationship between a downlink Logical channel and a downlink Transport channel according to an embodiment.

MBS transmission in LTE includes two schemes, i.e., a Multicast Broadcast Single Frequency Network (MBSFN) transmission and Single Cell Point To Multipoint (SC-PTM) transmission. FIG. 6 is a diagram illustrating a correspondence relationship between a downlink Logical channel and a downlink Transport channel according to an embodiment.

As illustrated in FIG. 6, the logical channels used for MBSFN transmission are a Multicast Traffic Channel (MTCH) and a Multicast Control Channel (MCCH), and the transport channel used for MBSFN transmission is a Multicast Channel (MCH). The MBSFN transmission is designed primarily for multi-cell transmission, and in an MBSFN area including a plurality of cells, each cell synchronously transmits the same signal (the same data) in the same MBSFN subframe.

The logical channels used for SC-PTM transmission are a Single Cell Multicast Traffic Channel (SC-MTCH) and a Single Cell Multicast Control Channel (SC-MCCH), and the transport channel used for SC-PTM transmission is a Downlink Shared Channel (DL-SCH). The SC-PTM transmission is primarily designed for single-cell transmission and corresponds to broadcast or multicast data transmission on a cell-by-cell basis. The physical channels used for SC-PTM transmission are a Physical Downlink Control Channel (PDCCH) and a Physical Downlink Shared Channel (PDSCH) and enable dynamic resource allocation.

Although an example will be mainly described below in which the MBS is provided using a scheme same as, and/or similar to, the SC-PTM transmission scheme, the MBS may be provided using the MBSFN transmission scheme. An example will be mainly described in which the MBS is provided using multicast. Accordingly, the MBS may be interpreted as multicast. Note that the MBS may be provided via broadcast.

It is assumed that the MBS data refers to data provided by the MBS. It is assumed that the MBS control channel refers to the MCCH or the SC-MCCH. It is assumed that MBS traffic channel refers to the MTCH or the SC-MTCH. Note that the MBS data may be transmitted via unicast. The MBS data may be referred to as MBS packets or MBS traffic.

The network can provide different MBS services for respective MBS sessions. The MBS session is identified by at least one of Temporary Mobile Group Identity (TMGI) and a session identifier, and at least one of these identifiers is referred to as an MBS session identifier. Such an MBS session identifier may be referred to as an MBS service identifier or a multicast group identifier.

The MBS session includes a multicast session and a broadcast session.

The multicast session is a session for delivering a multicast service. The multicast service provides a service to a group of UEs 100 joining a multicast session for an application requiring highly reliable QoS. The multicast session is available to the UE 100 in the RRC connected state. In the multicast session, the MBS data is transmitted via multicast. The UE 100 is to be in the RRC connected state in order to receive the multicast session.

The broadcast session is a session for delivering a broadcast service. The broadcast service provides a service to every UE 100 within a particular service area. The broadcast session is available to the UEs 100 in all RRC states (RRC idle state, RRC inactive state, and RRC connected state).

Figure 7:
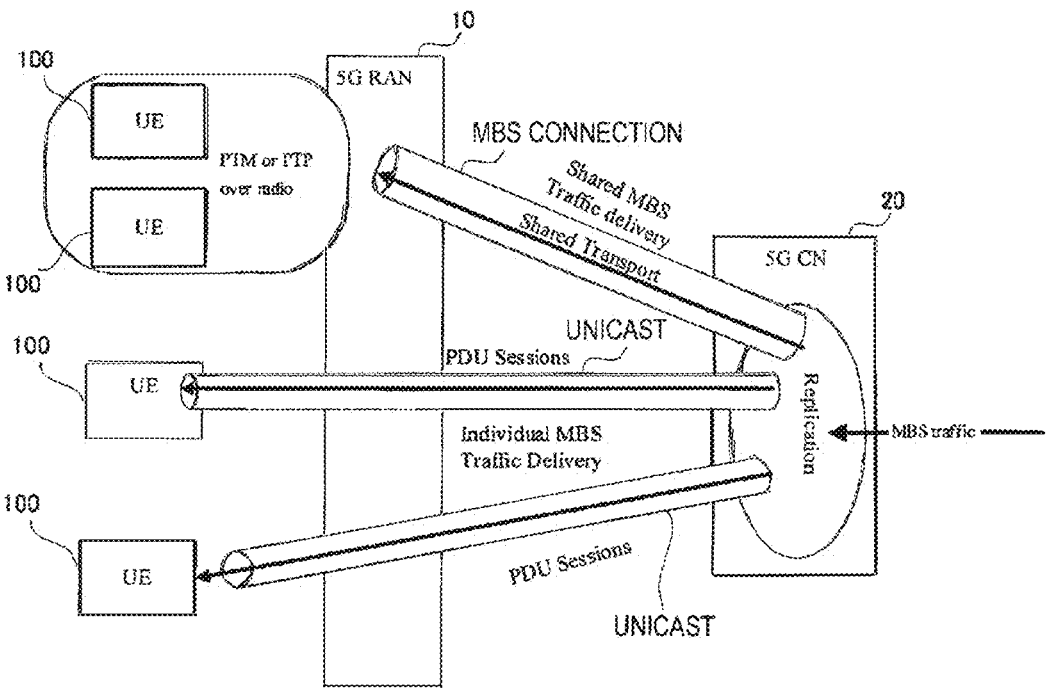
FIG. 7 is a diagram illustrating a delivery method of MBS data according to an embodiment.

FIG. 7 is a diagram illustrating a delivery method of the MBS data according to an embodiment.

As illustrated in FIG. 7, the MBS data (MBS Traffic) is delivered from a single data source (application service provider) to a plurality of UEs. The 5G CN (5GC) 20, which is a 5G core network, receives the MBS data from the application service provider and performs Replication of the MBS data to deliver the resultant.

From the perspective of the 5GC 20, two delivery methods are possible: shared MBS data delivery (Shared MBS Traffic delivery) and individual MBS data delivery (Individual MBS Traffic delivery).

In the shared MBS data delivery, a connection is established between the NG-RAN that is a 5G radio access network (5G RAN) and the 5GC 20 to deliver the MBS data from the 5GC 20 to the NG-RAN 10. Such a connection (a tunnel) is hereinafter referred to as an "MBS connection".

The MBS connection may be referred to as a Shared MBS Traffic delivery connection or a shared transport. The MBS connection terminates at the NG-RAN 10 (i.e., the gNB 200). The MBS connection may correspond to an MBS session on a one-to-one basis.

The gNB 200 selects a transmission scheme either of Point-to-Point (PTP: unicast) or Point-to-Multipoint (PTM: multicast or broadcast) at the discretion of the gNB 200 and transmits the MBS data to the UE 100 through the selected transmission scheme.

On the other hand, in the individual MBS data delivery, a unicast session is established between the NG-RAN 10 and the UE 100 to individually deliver the MBS data from the 5GC 20 to the UE 100. Such unicast may be referred to as a PDU Session. The unicast (PDU session) terminates at the UE 100.

Split MBS Bearer

A split MBS bearer according to an embodiment is described.

The gNB 200 can configure an MBS bearer split into a PTP communication path and a PTM communication path (hereinafter referred to as a "split MBS bearer" as appropriate) for the UE 100. This allows the gNB 200 to dynamically switch the transmission of the MBS data to the UE 100 between the PTP (PTP communication path) and the PTM (PTM communication path). The gNB 200 may perform duplication transmission of the same MBS data using both the PTP (PTP communication path) and the PTM (PTM communication path) to enhance reliability.

A predetermined layer terminating the split is the MAC layer (HARQ), the RLC layer, the PDCP layer, or the SDAP layer. Although an example in which the predetermined layer terminating the split is the PDCP layer will be mainly described below, the predetermined layer may be the MAC layer (HARQ), the RLC layer, or the SDAP layer.

Figure 8:
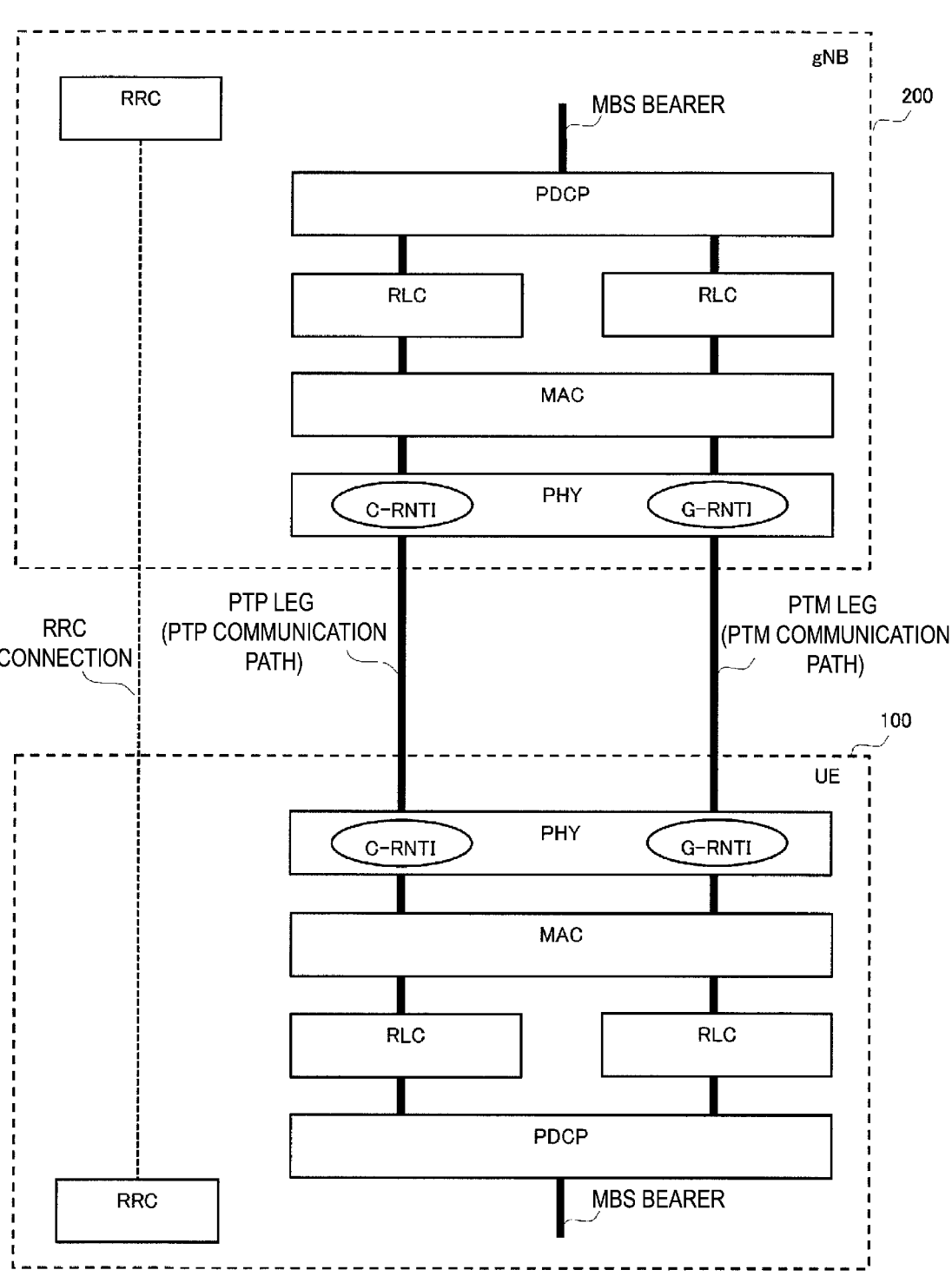
FIG. 8 is a diagram illustrating a split MBS bearer according to an embodiment.

FIG. 8 is a diagram illustrating the split MBS bearer according to an embodiment. Hereinafter, the PTP communication path is referred to as a PTP leg, and the PTM communication path is referred to as a PTM leg. A functional unit corresponding to each layer is referred to as an entity. Furthermore, in the PTM leg, the MBS data is transmitted via multicast.

As illustrated in FIG. 8, each of the PDCP entity of the gNB 200 and the PDCP entity of the UE 100 splits an MBS bearer, which is a bearer (data radio bearer) used for the MBS, into a PTP leg and a PTM leg. Note that the PDCP entity is provided for each bearer.

Each of the gNB 200 and the UE 100 includes two RLC entities provided for the respective legs, one MAC entity, and one PHY entity. The PHY entity may be provided per leg. Note that, in a Dual Connectivity in which the UE 100 communicates with two gNBs 200, the UE 100 may include two MAC entities.

The PHY entity transmits and receives data of the PTP leg using a cell RNTI (Cell Radio Network Temporary Identifier (C-RNTI)) that is allocated to the UE 100 on a one-to-one basis. The PHY entity transmits and receives data of the PTM leg using a group RNTI (Group Radio Network Temporary Identifier (G-RNTI)) allocated to the MBS session on a one-to-one basis. The C-RNTI is different for each UE 100, but the G-RNTI is an RNTI common to a plurality of UEs 100 receiving one MBS session.

In order to perform PTM transmission of the MBS data (multicast or broadcast) from the gNB 200 to the UE 100 using a PTM leg, a split MBS bearer is to be configured for the UE 100 from the gNB 200 and the PTM leg is to be activated (activation). In other words, even if a split MBS bearer is configured for the UE 100, when a PTM leg is in a deactivation state, the gNB 200 cannot perform the PTM transmission of the MBS data using the PTM leg.

In order that the gNB 200 and the UE 100 perform PTP transmission of the MBS data (unicast) using a PTP leg, a split MBS bearer is to be configured for the UE 100 from the gNB 200 and the PTP leg is to be activated. In other words, even if a split MBS bearer is configured for the UE 100, when a PTP leg is in a deactivation state, the gNB 200 cannot perform the PTP transmission of the MBS data using the PTP leg.

When the PTM leg is in an activated state, the UE 100 monitors a Physical Downlink Control Channel (PDCCH) to which a G-RNTI associated with the MBS session is applied (i.e., performs blind decoding of the PDCCH using the G-RNTI). The UE 100 may monitor the PDCCH only at a scheduling occasion of the MBS session.

When the PTM leg is in a deactivated state, the UE 100 does not monitor a PDCCH to which a G-RNTI associated with the MBS session is applied (i.e., does not perform blind decoding of the PDCCH using the G-RNTI).

When the PTP leg is in an activated state, the UE 100 monitors a PDCCH to which a C-RNTI is applied. When Discontinuous Reception (DRX) in the PTP leg is configured, the UE 100 monitors a PDCCH for a configured OnDuration period. When a cell (frequency) associated with the MBS session is specified, the UE 100 may monitor a PDCCH for the cell even when the cell is deactivated.

When the PTP leg is in a deactivated state, the UE 100 may monitor a PDCCH to which a C-RNTI is applied in preparation for normal unicast downlink transmission of other than the MBS data. Note that, when a cell (frequency) associated with an MBS session is specified, the UE 100 need not monitor the PDCCH for the MBS session.

Note that it is assumed that the above-described split MBS bearer is configured by use of an RRC message (for example, an RRC Reconfiguration message) transmitted by the RRC entity of the gNB 200 to the RRC entity of the UE 100.

RRC State Transition by Data Inactivity Timer

An RRC state transition by a data inactivity timer according to an embodiment will be described.

In current specifications of 5G/NR, the data inactivity timer is defined. The data inactivity timer is a timer for timing a time during which transmission and reception of data and signaling are not performed between the UE 100 and the gNB 200.

The UE 100 in the RRC connected state can be configured with the data inactivity timer from the gNB 200. The UE 100 transitions from the RRC connected state to the RRC idle state in response to expiration of the data inactivity timer.

The UE 100 starts the data inactivity timer in response to transmission or reception of data or signaling when the data inactivity timer is configured. The UE 100 restarts the data inactivity timer in response to transmission or reception of data or signaling before the data inactivity timer expires. Note that "restarts the data inactivity timer" means resetting and restarting the data inactivity timer.

As an example of transmission or reception of data, the MAC entity of the UE 100 transmits or receives a MAC SDU through a Dedicated Traffic Channel (DTCH) logical channel. The DTCH logical channel is a dedicated logical channel for data transmission.

As an example of transmission or reception of signaling, the MAC entity of the UE 100 transmits or receives the MAC SDU through a Dedicated Control Channel (DCCH) logical channel. The DCCH logical channel is a dedicated logical channel for signaling transmission. Note that for details of the data inactivity timer, see, for example, "5.19 Data inactivity monitoring" in 3GPP TS 38.321 V16.3.0 and "5.3.8.5 UE actions upon the expiry of DataInactivityTimer" in 3GPP TS 38.331 V16.3.0.

First Operation Pattern

A first operation pattern according to an embodiment will be described.

When the UE 100 receives the MBS data transmitted via multicast and the above-described data inactivity timer is applied, the following problem occurs.

The gNB 200 configures an MBS bearer for the UE 100 in the RRC connected state and starts transmission of the MBS data via multicast. At this point, the gNB 200 recognizes that the UE 100 is in the RRC connected state. Upon receiving the MBS data transmitted via multicast, the UE 100 starts the data inactivity timer. When the data inactivity timer is running and radio condition deteriorates in the UE 100, the UE 100 cannot successfully receive the MBS data and does not restart the data inactivity timer. Thereafter, the UE 100 transitions to the RRC idle state in response to the expiration of the data inactivity timer. This causes a problem of mismatch of the RRC state between the gNB 200 and the UE 100. Note that as described above, the MBS data may be provided not only via multicast but also via broadcast.

On the other hand, the UE 100 typically transmits feedback information (for example, acknowledgement information (ACK/NACK)) on reception of data to the gNB 200 when data transmitted via normal unicast is received. Therefore, as described above, even when the UE 100 transitions to the RRC idle state due to deterioration of the radio condition, the gNB 200 can assume that the UE 100 has transitioned to the RRC idle state in response to not receiving the feedback information from the UE 100. Therefore, the problem of mismatch of the RRC state is not significant.

However, when the UE 100 receives the MBS data transmitted via multicast, transmission of the feedback information may not be configured. In this case, the problem of mismatch of the RRC state is significant.

Note that the UE 100 receiving the MBS data transmitted via multicast refers to one of the following: 1) the UE 100 is configured with an MBS bearer including only a PTM leg and receives the MBS data via the MBS bearer; 2) the UE 100 is configured with a split MBS bearer including a PTM leg and a PTP leg and receives the MBS data via the PTM leg; and 3) the UE 100 receives the MBS data using the G-RNTI.

In the first operation pattern according to an embodiment, the UE 100 manages the data inactivity timer. In management of the data inactivity timer, when receiving the MBS data transmitted via multicast, the UE 100 controls not to start the data inactivity timer even if the MBS data is received. Thus, since the UE 100 does not start the data inactivity timer, there is no transition to the RRC idle state in response to the expiration of the data inactivity timer, and above-described problem of mismatch of the RRC state is solved.

In the first operation pattern, when receiving the MBS data transmitted via unicast, the UE 100 starts or restarts the data inactivity timer in response to reception of the MBS data. As described above, since the transmission of feedback information is configured in the case of unicast, the problem of mismatch of the RRC state is not significant.

Note that the UE 100 receiving the MBS data transmitted via unicast refers to one of the following: 1) the UE 100 is configured with an MBS bearer including only a PTP leg and receives the MBS data via the MBS bearer; 2) The UE 100 is configured with the split MBS bearer including the PTM leg and the PTP leg and receives the MBS data via the PTP leg; and 3) the UE 100 receives the MBS data using the C-RNTI.

Figure 9:
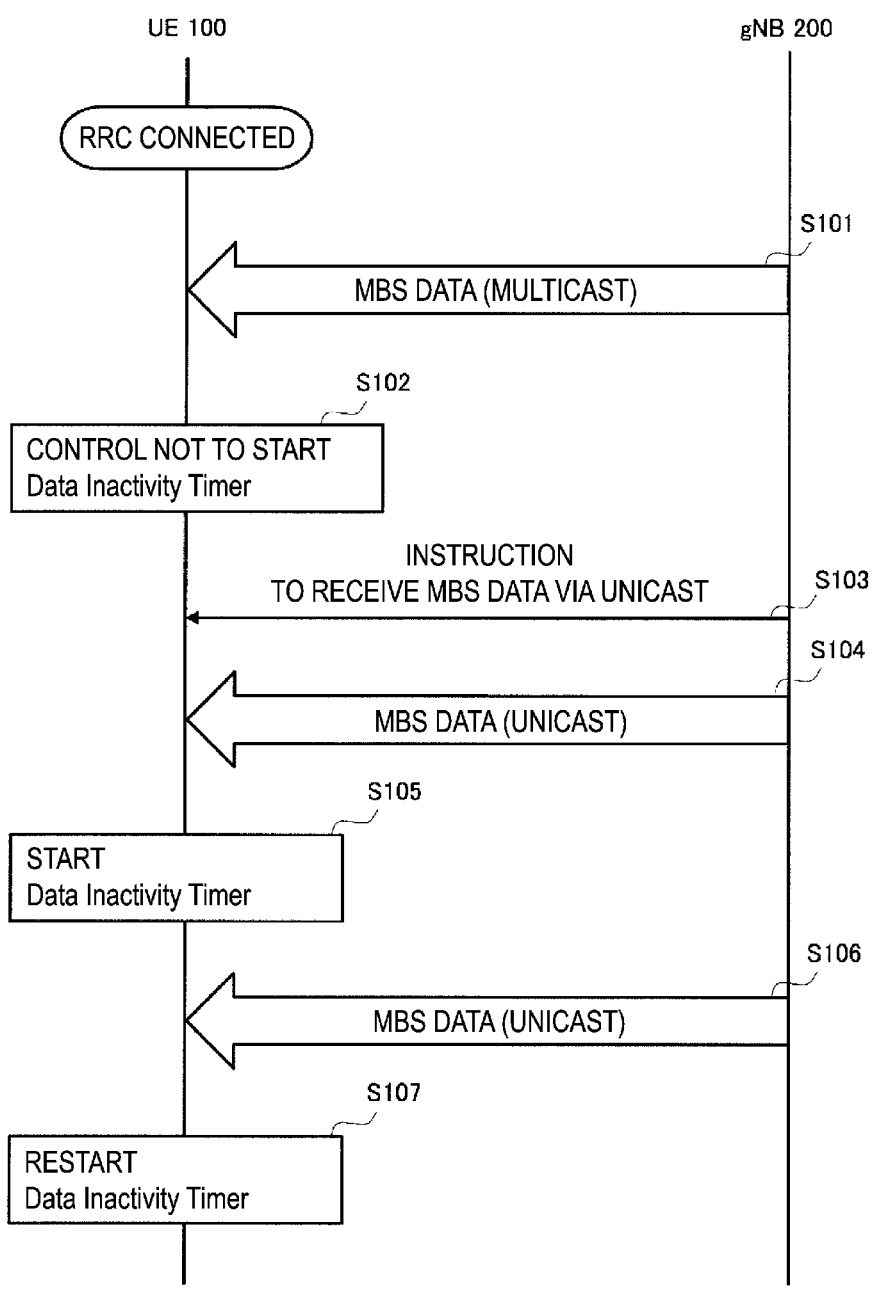
FIG. 9 is a diagram illustrating an operation example of a first operation pattern according to an embodiment.

FIG. 9 is a diagram illustrating an operation example of the first operation pattern according to an embodiment. In an initial state of FIG. 9, the UE 100 is in the RRC connected state, and the data inactivity timer is configured for the UE 100 from the gNB 200.

As illustrated in FIG. 9, in step S101, the gNB 200 transmits the MBS data via multicast. The UE 100 receives the MBS data retransmitted via multicast.

In step S102, the UE 100 receives the MBS data transmitted via multicast but controls not to start the data inactivity timer. Note that even when the data inactivity timer has already been started at this point, the UE 100 controls not to restart the data inactivity timer. For example, before step S102, the UE 100 starts the data inactivity timer in response to transmission and reception of data (data other than the MBS data) via normal unicast, and in step S102, the UE 100 controls not to restart the data inactivity timer.

In step S103, the gNB 200 instructs the UE 100 to receive the MBS data via unicast. The UE 100 receives the instruction from the gNB 200. Here, the instruction may be an RRC Reconfiguration message for configuring the MBS bearer including only the PTP leg, or an instruction (for example, a MAC Control Element (CE) or Downlink Control Information (DCI)) for activating the PTP leg of the split MBS bearer already configured for the UE 100.

In step S104, the gNB 200 transmits the MBS data to the UE 100 via unicast. The UE 100 receives the MBS data retransmitted via unicast.

In step S105, the UE 100 starts the data inactivity timer in response to the reception of the MBS data transmitted via unicast.

In steps S106 to S107, the UE 100 restarts the data inactivity timer in response to the reception of the MBS data transmitted via unicast.

Second Operation Pattern

A second operation pattern according to an embodiment will be described focusing on differences from the above-described operation pattern.

In the second operation pattern, even when the MBS data transmitted via unicast is received, the UE 100 controls not to start the data inactivity timer even if the MBS data is received. Thus, in the UE 100, processing of determining whether to start the data inactivity timer can be simplified.

Figure 10:
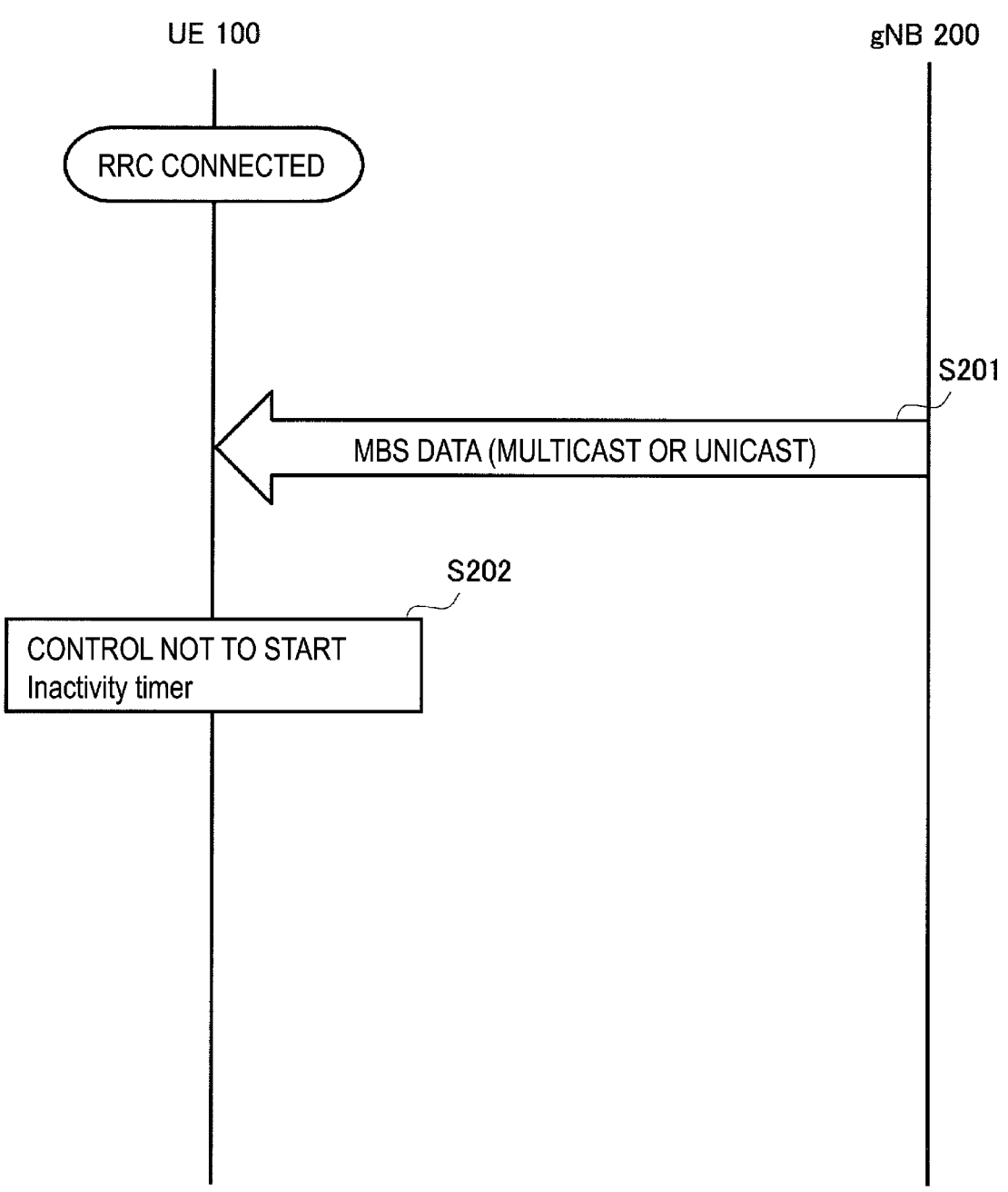
FIG. 10 is a diagram illustrating an operation example of a second operation pattern according to an embodiment.

FIG. 10 is a diagram illustrating an operation example of the second operation pattern according to an embodiment. In the operation example, it is assumed that the UE 100 is in the RRC connected state, and the data inactivity timer is configured for the UE 100 from the gNB 200.

As illustrated in FIG. 10, in step S201, the gNB 200 transmits the MBS data via unicast or multicast. The UE 100 receives the MBS data.

In step S202, the UE 100 receives the MBS data but controls not to start the data inactivity timer. Note that even when the data inactivity timer has already been started at this point, the UE 100 controls not to restart the data inactivity timer. For example, before step S202, the UE 100 starts the data inactivity timer in response to transmission and reception of data (data other than the MBS data) via normal unicast, and in step S202, the UE 100 controls not to restart the data inactivity timer.

Third Operation Pattern

A third operation pattern according to an embodiment will be described focusing on differences from the above-described operation patterns.

In the third operation pattern, the UE 100 controls to start or not to start the data inactivity timer upon receiving the MBS data according to configuration information from the gNB 200.

Figure 11:
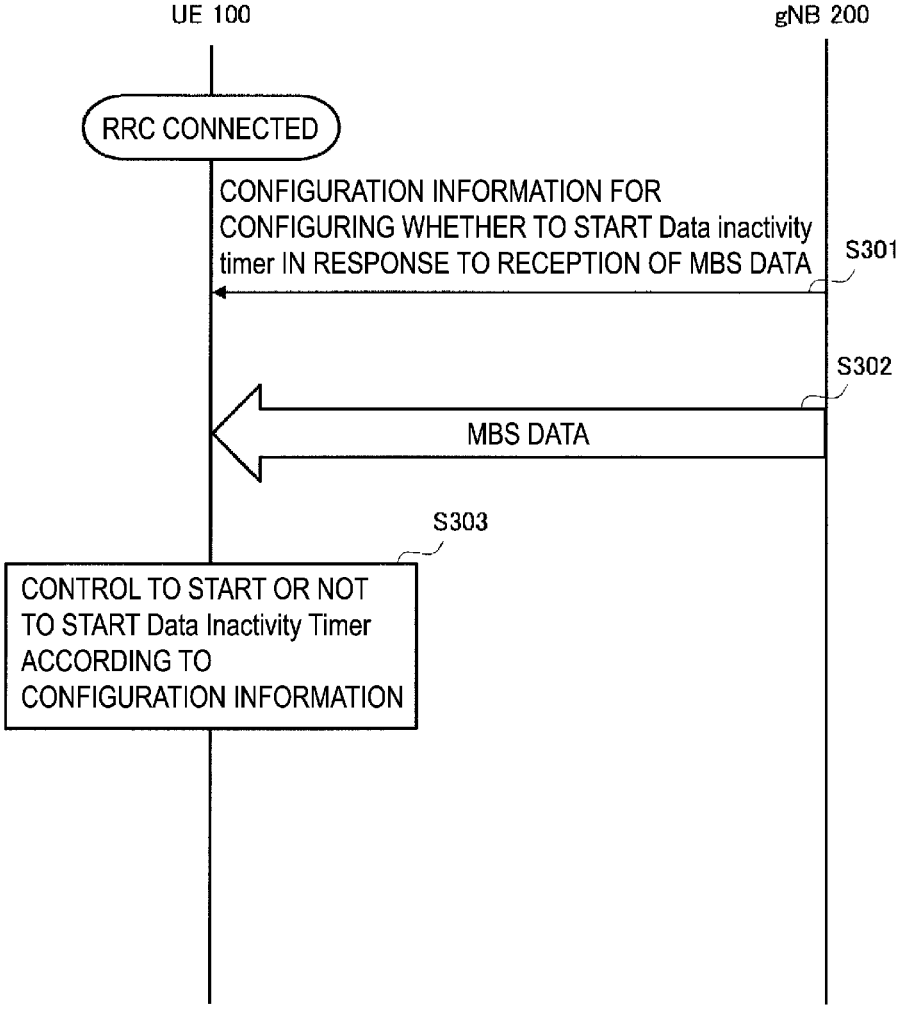
FIG. 11 is a diagram illustrating an operation example of a third operation pattern according to an embodiment.

FIG. 11 is a diagram illustrating an operation example of the third operation pattern according to an embodiment. In the operation example, it is assumed that the UE 100 is in the RRC connected state, and the data inactivity timer is configured for the UE 100 from the gNB 200.

As illustrated in FIG. 11, in step S301, the gNB 200 transmits, to the UE 100, configuration information for configuring whether to start the data inactivity timer upon receiving the MBS data. The UE 100 receives the configuration information from the gNB 200.

The configuration information is transmitted to the UE 100 in, for example, the RRC Reconfiguration message. The configuration information may further include an identifier (such as a TMGI) of an MBS session corresponding to the MBS data. For example, the configuration information includes, for each of a plurality of MBS sessions in which the gNB 200 stops, a set of an identifier (TMGI) of the MBS session and information for configuring whether to start the data inactivity timer upon receiving the MBS data belonging to the MBS session.

In step S302, the gNB 200 transmits the MBS data. The UE 100 receives the MBS data.

In step S303, UE 100 controls to start or not to start the data inactivity timer according to the configuration information received in step S301 when receiving the MBS data.

In the third operation pattern, the configuration information may be information for configuring whether to transmit feedback information (for example, acknowledgement information (ACK/NACK)) for the MBS data. In this case, the UE 100 controls to start the data inactivity timer when receiving the MBS data for which the transmission of the feedback information is configured and not to start the data inactivity timer when receiving the MBS data for which the transmission of the feedback information is not configured.

Fourth Operation Pattern

A fourth operation pattern according to an embodiment will be described focusing on differences from the above-described operation patterns.

As described above, in the current specifications of 5G/NR, the data inactivity timer covers data and signaling transmitted and received via unicast. When the UE 100 transmits and receives data via normal unicast in a state of receiving the MBS data transmitted via multicast, the UE 100 starts the data inactivity timer. When the data inactivity timer is operating and transmission and reception of data via normal unicast are not performed, the UE 100 transitions to the RRC idle state in response to the expiration of the data inactivity timer. Since the UE 100 is to be in the RRC connected state in order to receive the MBS data transmitted via multicast, the UE 100 having transitioned to the RRC idle state cannot receive the MBS data transmitted via multicast.

In the fourth operation pattern, when receiving the MBS data transmitted via multicast, the UE 100 restarts the data inactivity timer by transmitting restart information to the gNB 200 before the data inactivity timer expires. In the current specifications, the UE 100 is specified to restart the data inactivity timer by transmitting signaling. Therefore, the UE 100 restarts the data inactivity timer in response to transmission of the restart information. Accordingly, the UE 100 does not transition to the RRC idle state in response to the expiration of the data inactivity timer and can continuously receive the MBS data transmitted via multicast.

Figure 12:
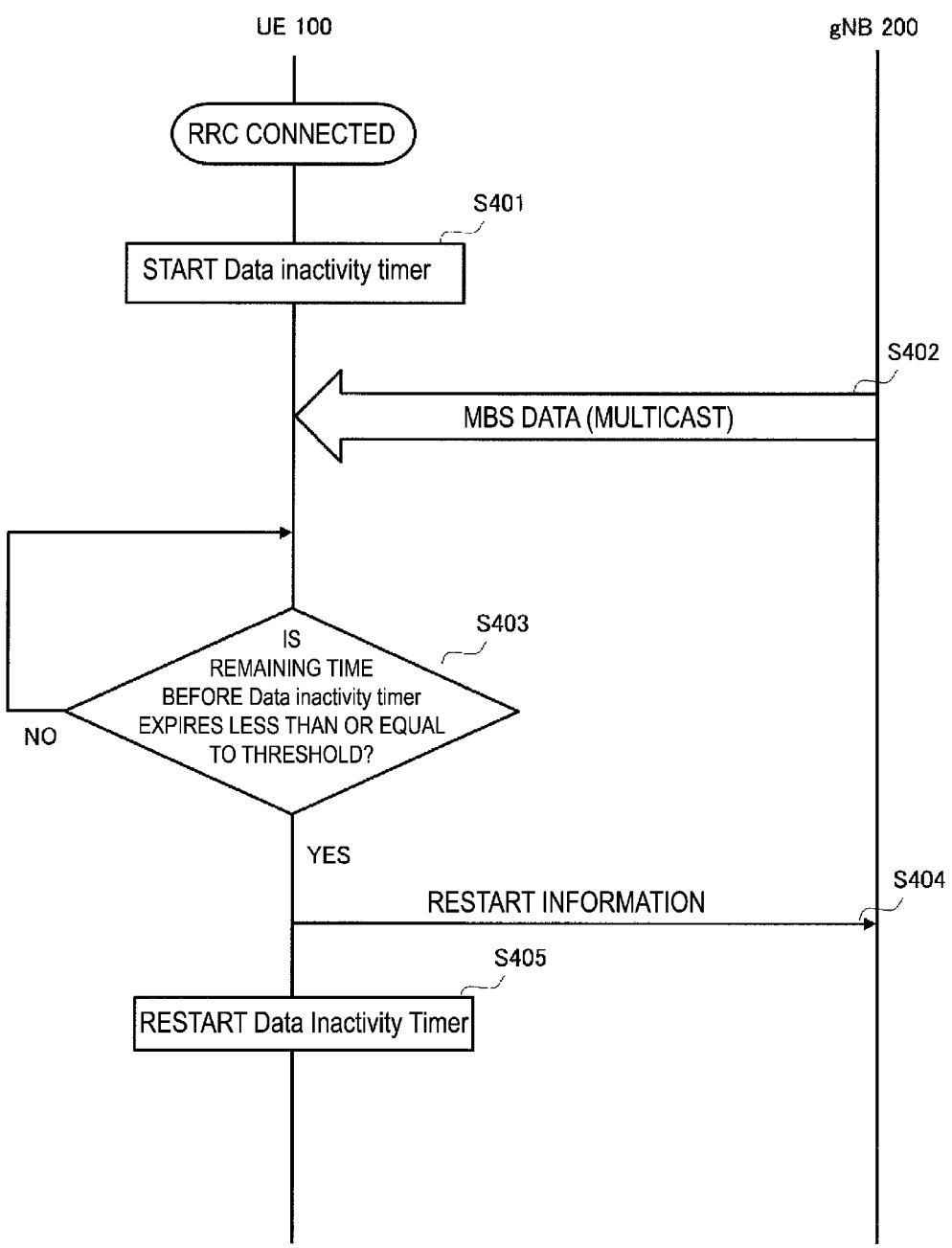
FIG. 12 is a diagram illustrating an operation example of a fourth operation pattern according to an embodiment.

FIG. 12 is a diagram illustrating an operation example of the fourth operation pattern according to an embodiment. In the operation example, it is assumed that the UE 100 is in the RRC connected state, and the data inactivity timer is configured for the UE 100 from the gNB 200.

As illustrated in FIG. 12, in step S401, the UE 100 starts the data inactivity timer. Here, for example, the UE 100 starts the data inactivity timer in response to transmission and reception of data (data other than the MBS data) via unicast. The UE 100 may start the data inactivity timer in response to transmission and reception of signaling.

In step S402, the gNB 200 transmits the MBS data via multicast. The UE 100 receives the MBS data retransmitted via multicast.

In step S403, the UE 100 determines whether a remaining time before the data inactivity timer expires is less than or equal to a threshold. The threshold may be a value configured by the UE 100 itself. Furthermore, the threshold may be a value configured for the UE 100 from the gNB 200.

When the remaining time is less than or equal to the threshold (step S403: YES), in step S404, the UE 100 transmits the restart information to the gNB 200. The UE 100 may transmit the restart information in the RRC message. Alternatively, the UE 100 may transmit the restart information in the MAC CE. The restart information may be information for notifying the gNB 200 of resetting and restarting the data inactivity timer. The restart information may be a 1-bit flag indicating that the UE 100 continues to receive the MBS data. Note that the gNB 200 may transmit a response to the restart information to the UE 100 in response to reception of the restart information.

In step S405, the UE 100 resets and restarts the data inactivity timer in response to the transmission of the restart information.

In the fourth operation pattern, the UE 100 may periodically transmit the restart information before the data inactivity timer expires.

In the above description, in S403, the remaining time before the data inactivity timer expires is compared with the threshold, but the present disclosure is not limited thereto. The UE 100 may separately include a timer for transmitting the restart information. The UE 100 starts or restarts the timer when the restart information is transmitted and transmits the restart information again when the timer expires. The UE 100 stops (or discards) the timer when the reception of the MBS data is no longer performed (when there is no interest in the reception or when MBS data transmission or MBS session is ended). The timer value may be configured from the gNB 200.

In the fourth operation pattern, the restart information may be transmitted from the gNB 200. Specifically, the gNB 200 manages the data inactivity timer similarly to the UE 100, and the gNB 200 starts/restarts the data inactivity timer in response to transmission and reception of data via unicast with the UE 100. In this case, while the MBS data is being transmitted, when the remaining time of the data inactivity timer managed by the gNB 200 is less than or equal to the threshold, the gNB 200 transmits the restart information to the UE 100 via unicast. In response to the reception of the restart information, the UE 100 restarts the data inactivity timer managed by the UE 100. Note that the gNB 200 may reset and restart the data inactivity timer managed by the gNB 200 in response to the reception of the restart information from the UE 100.

OTHER EMBODIMENTS

In each of the above-described operation patterns, handling of a timer associated with MBS data reception has been described on the assumption that the data inactivity timer is configured for the UE 100; however, when the gNB 200 transmits the MBS data via multicast (PTM), an operation is considered in which the data inactivity timer is not configured for the UE 100. In this case, in the RRC Reconfiguration message, MBS configuration (or PTM configuration) and data inactivity timer configuration can be exclusively configured. Alternatively, when the MBS configuration (or the PTM configuration) is performed, the UE 100 may ignore the data inactivity timer even if it is configured. That is, it may be assumed that the data inactivity timer is not configured.

The operation patterns described above can be separately and independently implemented and also be implemented in combination of two or more of the operation patterns. For example, some steps in one operation pattern may be added to another operation pattern. In addition, some steps in one operation pattern may be replaced with some steps in another operation pattern.

In the embodiment described above, an example in which the base station is an NR base station (i.e., a gNB) is described; however, the base station may be an LTE base station (i.e., an eNB). The base station may be a relay node such as an Integrated Access and Backhaul (IAB) node. The base station may be a Distributed Unit (DU) of the IAB node.

A program causing a computer to execute each of the processes performed by the UE 100 or the gNB 200 may be provided. The program may be recorded on a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM.

Circuits for executing processing performed by the UE 100 or the gNB 200 may be integrated, and at least a part of the UE 100 or the gNB 200 may be implemented as a semiconductor integrated circuit (chipset, system on a chip (SoC)).

The descriptions of "based on" and "depending on" used in the present disclosure do not mean "based on only" or "depending on only" unless explicitly stated otherwise. The phrase "based on" means both "based only on" and "based at least in part on". The phrase "depending on/in response to" means both "only depending on/in response to" and "at least partially depending on/in response to". In addition, "obtain/acquire" may mean to obtain information from stored information, may mean to obtain information from information received from another node, or may mean to obtain the information by generating the information. The terms "include", "comprise" and variations thereof do not mean "include only items stated" but mean "may include only the items stated" or "may include not only the items stated but also other items". The term "or" used in the present disclosure is not intended to be "exclusive or". Any reference to elements using designations such as "first" and "second" as used in the present disclosure does not generally limit quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a", "an", and "the" are added in the present disclosure through translation, these articles include the plural unless clearly indicated otherwise in context.

Embodiments have been described above in detail with reference to the drawings, but specific configurations are not limited to those described above, and various design variation can be made without departing from the gist of the present disclosure.

REFERENCE SIGNS

10: NG-RAN (5G RAN)
20: 5GC (5G CN)
100: UE

14

110: Receiver
120: Transmitter
130: Controller
200: gNB
210: Transmitter
220: Receiver
230: Controller
240: Backhaul communicator

The invention claimed is:

1. A communication control method performed by a user equipment in a mobile communication system configured to provide a multicast broadcast service (MBS), the communication control method comprising:

receiving MBS data from a network when the user equipment is in a Radio Resource Control (an RRC) connected state;

managing a data inactivity timer used for data inactivity monitoring; and transitioning from the RRC connected state to an RRC idle state in response to expiration of the data inactivity timer, wherein the managing the data inactivity timer comprises when the MBS data transmitted via broadcast is received, controlling not to start the data inactivity timer even if the MBS data is received.

2. The communication control method according to claim 1, wherein the managing the timer further comprises starting or restarting the timer in response to reception of the MBS data when the MBS data transmitted via unicast is received.

3. A user equipment in a mobile communication system configured to provide a multicast broadcast service (MBS), the user equipment comprising:

a receiver configured to receive MBS data from a network when the user equipment is in a Radio Resource Control (an RRC) connected state; and a controller configured to manage a data inactivity timer used for data inactivity monitoring, wherein the controller is configured to transition from the RRC connected state to an RRC idle state in response to expiration of the data inactivity timer, the controller is configured to, when the MBS data transmitted via broadcast is received, control not to start the data inactivity timer even if the MBS data is received.

4. An apparatus configured to control a user equipment in a mobile communication system configured to provide a multicast broadcast service (MBS), the apparatus comprising a processor and a memory, the processor configured to receive MBS data from a network when the user equipment is in a Radio Resource Control (an RRC) connected state, manage a data inactivity timer used for data inactivity monitoring, transition from the RRC connected state to an RRC idle state in response to expiration of the data inactivity timer, and when the MBS data transmitted via broadcast is received, control not to start the data inactivity timer even if the MBS data is received.

* * * * *